United States Patent [19]

Oversluizen et al.

[11] Patent Number: 4,798,768
[45] Date of Patent: Jan. 17, 1989

[54] LUMINESCENT ALUMINO-SILICATE AND/OR ALUMINO-BORATE GLASS COMPRISING LANTHANUM AND/OR GADOLINIUM AND LUMINESCENT SCREEN PROVIDED WITH SUCH A GLASS

[75] Inventors: Gerrit Oversluizen; Anne-Marie A. Van Dongen, both of Eindhoven, Netherlands

[73] Assignee: U.S. Philips Corporation, New York, N.Y.

[21] Appl. No.: 105,921

[22] Filed: Oct. 7, 1987

[30] Foreign Application Priority Data

Oct. 8, 1986 [NL] Netherlands ........................ 8602518

[51] Int. Cl.$^4$ .............................................. C09K 11/80
[52] U.S. Cl. .............................. 428/426; 252/301.4 F; 252/301.4 P; 252/301.4 R; 428/690; 501/50; 501/64
[58] Field of Search ................. 252/301.4 F, 301.4 R, 252/301.4 P; 501/50, 64; 428/426, 690

[56] References Cited

U.S. PATENT DOCUMENTS

| | | | |
|---|---|---|---|
| 3,523,091 | 8/1970 | McAllister | 252/301.4 F |
| 3,935,119 | 1/1976 | Barber et al. | 252/301.4 F |
| 4,102,805 | 7/1978 | Mizzoni et al. | 252/301.4 F |

FOREIGN PATENT DOCUMENTS

| | | | |
|---|---|---|---|
| 46-3447 | 1/1971 | Japan | 252/301.4 F |
| 56-155283 | 12/1981 | Japan | 252/301.4 F |

*Primary Examiner*—Jack Cooper
*Attorney, Agent, or Firm*—John C. Fox

[57] ABSTRACT

Luminescent alumino-silicate and/or alumino-borate glass comprising lanthanum and/or gadolinium and activated by $Tb^{3+}$ and/or $Ce^{3+}$ and have a composition comprising 35-85 mol % of $SiO_2$ and/or $B_2O_3$, 1-35 mol % of $La_2O_3$ and/or $Gd_2O_3$, 5-45 mol % of $Al_2O_3$ and 0.5-30 mol % of $Tb_2O_3$ and/or $Ce_2O_3$. The $La_2O_3$ and/or $Gd_2O_3$ may be replaced up to not more than 50 mol % by $Y_2O_3$, $Sc_2O_3$, $Lu_2O_3$, $ZrO_2$, $P_2O_5$ and/or alkaline earth metal oxides. The glass can be used in a luminescent screen, for example, of a low-pressure mercury vapour discharge lamp.

4 Claims, No Drawings

LUMINESCENT ALUMINO-SILICATE AND/OR ALUMINO-BORATE GLASS COMPRISING LANTHANUM AND/OR GADOLINIUM AND LUMINESCENT SCREEN PROVIDED WITH SUCH A GLASS

BACKGROUND OF THE INVENTION

The invention relates to a luminescent alumino-silicate and/or alumino-borate glass comprising lanthanum and/or gadolinium and activated by a rare earth metal. The invention also relates to a luminescent screen provided with such a glass.

Luminescent glasses of the type described above are known from U.S. Pat. No. 4,102,805, describing luminescent alumino-silicate glasses activated by bivalent europium and also comprising a further oxide, for example, lanthanum oxide. The Japanese patent application No. 74-99610, laid open to public inspection, describes luminescent silicate and/or borate glasses activated by trivalent terbium and trivalent europium, which comprise one or more of the oxides of aluminium, lanthanum and the alkaline earth metals and furthermore an alkali metal oxide.

A drawback of the known luminescent glasses is that they generally have a low efficiency. Particularly the quantum efficiency upon excitation by ultraviolet radiation is often found to be a factor of 5 to 10 smaller than the quantum efficiencies which can be achieved with efficient crystalline materials. A further drawback of the alkali-metal containing luminescent glasses is that they generally have a large decline in the luminous flux in practical uses, for example, in discharge lamps.

Luminescent alumino-borate and/or alumino-silicate glasses activated by $Tb^{3+}$ and/or $Ce^{3+}$ and comprising one or more alkaline earth metal oxides are known from Netherlands patent application No. 58501107 (PHN 11.363).

It is an object of the invention to provide novel luminescent glasses having high conversion efficiencies and notably high quantum efficiencies upon excitation by ultraviolet radiation.

Summary Of The Invention

According to the invention a luminescent alumino-silicate and/or alumino-borate glass comprising lanthanum and/or gadolinium and activated by a rare earth metal is characterized in that the glass is activated by at least one of the rare earth metals $Tb^{3+}$ and $Ce^{3+}$ and has a composition comprising 35-85 mol% of $SiO_2$ and/or $B_2O_3$, 1-35 mol% of $La_2O_3$ and/or $Gd_2O_3$, 5-45 mol% of $Al_2O_3$ and 0.5-30 mol% of $Tb_2O_3$ and/or $Ce_2O_3$, in which the $La_2O_3$ and/or $Gd_2O_3$ may be replaced up to not more than 50 mol% by one or more of the oxides $Y_2O_3$, $Sc_2O_3$, $Lu_2O_3$, Zr $ZrO_2$, $P_2O_5$ and the alkaline earth metal oxides.

Experiments which have led to the invention have shown that glasses having a composition in the range mentioned above constitute very efficiently luminescing materials. Upon activation by terbium, glasses are obtained having the characteristic green $Tb^{3+}$-emission (maximum at approximately 540 nm) and upon activation by cerium an emission is obtained in a band in the blue or near ultraviolet part of the spectrum. When using both Ce and Tb there is transfer of excitation energy from the Ce to the Tb. Particularly it was found that quantum efficiencies of 80% and more are possible upon UV-excitation. It has been found that for obtaining such high efficiencies it is important that the glass matrix (that is to say, the glass composition without the activator oxide $Tb_2O_3$ and/or $Ce_2O_3$) is transparent to the exciting ultraviolet radiation. In fact, no excitation energy is then lost due to absorption of exciting radiation in the matrix of the glass which is constituted by the transparent oxides $SiO_2$ and/or $B_2O_3$, $La_2O_3$ and/or $Gd_2O_3$ and $Al_2O_3$ and which contains a minimum number of impurities. Useful absorption of the exciting ultraviolet radiation takes place in the activators $Tb^{3+}$ and/or $Ce^{3+}$. Upon activation by $Tb^{3+}$ the $Tb_2O_3$ content may be chosen to be relatively high. In the case of $Tb_2O_3$ contents of less than 0.5 mol%, too low luminous fluxes are obtained because then the absorption of ultraviolet radiation is too small. $Tb_2O_3$ contents of more than 30 mol% are not used because then too low luminous fluxes are obtained due to concentration quenching on the one hand and the glass formation is very difficult or impossible on the other hand. Upon activation by $Ce^{3+}$ the $Ce_2O_3$ content is chosen to be not smaller than 0.5 mol% for the same reason as for $Tb^{3+}$. The upper limit of the $Ce_2O_3$ content will be approximately 5 mol% in practice because undesired formation of $Ce^{4+}$ can hardly be avoided in the case of higher concentrations.

The composition of the luminescent glass according to the invention is to be chosen within the above defined range, because it has been found that glass formation is not very well possible outside this range due to a too high melting temperature and/or due to inevitable crystallisation of the glass. It was found that, as far as the glass formation permits, the $La_2O_3$ and/or $Gd_2O_3$ can be replaced without any objection, up to not more than 50 mol% by one or more of the oxides $Y_2O_3$, $Sc_2O_3$, $Lu_2O_3$, $ZrO_2$, $P_2O_5$ and the alkaline earth metals which do not have a disturbing UV absorption. Alkaline earth metals in this description and the Claims are understood to be the elements Mg, Ca, Sr, Ba and Zn.

Because of their high quantum efficiencies the luminescent glasses according to the invention can be used instead of crystalline luminescent materials in, for example, discharge lamps. They then have great advantages with respect to crystalline materials. For example, there is a greater possibility of variation in the composition so that optimization of the luminescent properties is better possible. The glasses also have their specific favourable possibilities of processing and design. The glass may be used in, for example, luminescent glass fibres. The luminescent glasses according to the invention can also be used advantageously in cathode ray tubes and in solid state lasers.

Preference is given to a luminescent glass according to the invention which is characterized in that the glass comprises 50-80 mol% of $SiO_2$ and/or $B_2O_3$, 1-20 mol% of $La_2O_3$, 10-30 mol% of $Al_2O_3$ and 0.5-15 mol% of $Tb_2O_3$ and/or $Ce_2O_3$. In fact, it has been found that in this preferred range of compositions the glass formation proceeds most easily and that the highest quantum efficiencies are obtained.

The luminescent glasses are preferably used in a luminescent screen which has a luminescent layer comprising the luminescent glass according to the invention and which layer can be provided on a support. Such screens are used in, for example, discharge lamps, preferably low-pressure mercury vapour discharge lamps.

The luminescent glasses according to the invention can be obtained by heating a starting mixture of the composite oxides, or of compounds yielding these oxides at an elevated temperature, to a high temperature in a furnace until at least the melting point is reached. The melting point is generally in the range between 1000° and 1800° C., dependent on the composition. The heat treatment is preferably carried out in a weakly reducing atmosphere in order to obtain or maintain the terbium and/or cerium in the trivalent state. The melt is maintained at a high temperature for some time, which leads to homogenization, and is subsequently cooled.

DESCRIPTION OF THE PREFERRED EMBODIMENTS

A number of examples of luminescent glasses according to the invention and a number of measurements will now be described in greater detail.

EXAMPLE 1

A mixture was made of 0.70 mol of $B_2O_3$ 0.15 mol of $Al_2O_3$ 0.12 mol of $La_2O_3$ 0.015 mol of $Tb_4O_7$ This mixture of starting materials all having a high degree of purity (at least 99.99% for the rare earth metal oxides and at least 99.999% for the other oxides) was heated to 1200° C. in an aluminium oxide crucible in a furnace. The molten mixture was maintained at this temperature for 1 hour. During the heat treatment a weakly reducing gas (nitrogen with approximately 5% by volume of hydrogen) was passed through the melt via a tube projecting into the mixture. Subsequently the melt was quickly cooled by pouring in a carbon mold. The luminescent $Tb^{3+}$-activated glass obtained was broken and subjected to a grinding treatment, whereafter the pulverulent product was ready for use. Upon excitation by 254 nm radiation (absorption A=52%) a quantum efficiency q of 91% was measured.

EXAMPLES 2 TO 8

Analogously as described in Example 1, a number of Tb-activated alumino-silicate and alumino-silicate-borate glasses having different compositions was prepared. These glasses were all melted in a quartz crucible (the glass of example 2 at 1450° C., the other glasses at (1500° C.) in a weakly reducing atmosphere. The following Table states for these glasses the composition in mol% as well as the results of measurements of absorption A (in %) of the exciting 254 nm radiation and of the quantum efficiency q (in %) upon 254 nm excitation. Likewise as the glass of Example 1, these glasses had the characteristic green line emission of $Tb^{3+}$.

| Example | Composition (mol %) | A(%) | q(%) |
|---|---|---|---|
| 2 | 60 $SiO_2$ 25 $Al_2O_3$ 10 $La_2O_3$ 5 $Tb_2O_3$ | 63 | 77 |
| 3 | 60 $SiO_2$ 25 $Al_2O_3$ 10 $Gd_2O_3$ 5 $Tb_2O_3$ | 67 | 78 |
| 4 | 60 $SiO_2$ 10 $B_2O_3$ 20 $Al_2O_3$ 5 $La_2O_3$ 5 $Tb_2O_3$ | 57 | 72 |
| 5 | 60 $SiO_2$ 10 $B_2O_3$ 20 $Al_2O_3$ 3 $La_2O_3$ 2 $Y_2O_3$ 5 $Tb_2O_3$ | 48 | 46 |
| 6 | 60 $SiO_2$ 10 $B_2O_3$ 20 $Al_2O_3$ 3 $La_2O_3$ 2 $Gd_2O_3$ 5 $Tb_2O_3$ | 58 | 67 |
| 7 | 60 $SiO_2$ 10 $B_2O_3$ 20 $Al_2O_3$ 3 $La_2O_3$ 2 $ZrO_2$ 5 $Tb_2O_3$ | 56 | 60 |
| 8 | 60 $SiO_2$ 10 $B_2O_3$ 20 $Al_2O_3$ 3 $La_2O_3$ 2 CaO 5 $Tb_2O_3$ | 56 | 53 |

EXAMPLES 9 TO 14

A number of glasses according to the invention activated by $Ce^{3+}$ or by $Ce^{3+}$ and $Tb^{3+}$ was prepared in an analogous manner as described in Example 1. All glasses were melted in aluminium oxide crucibles at 1200° C. in a weakly reducing atmosphere. The following Table shows the compositions and also the quantum efficiencies q (in %) upon excitation by 254 nm radiation as well as the absorption A (in %) of the exciting radiation. The glass activated by $Ce^{3+}$ only had an emission in a band with a maximum at approximately 375 nm. In the glasses activated by $Ce^{3+}$ and $Tb^{3+}$ a transfer of excitation energy was effectively realized from the Ce to the Tb and the characteristic $Tb^{3+}$ emission was obtained with these glasses.

| Example | Composition (mol %) | A(%) | q(%) |
|---|---|---|---|
| 9 | 70 $B_2O_3$ 15 $Al_2O_3$ 13 $La_2O_3$ 2 $Ce_2O_3$ | 87 | 65 |
| 10 | 70 $B_2O_3$ 15 $Al_2O_3$ 11 $La_2O_3$ 1 $Ce_2O_3$ 3 $Tb_2O_3$ | 83 | 74 |
| 11 | 70 $B_2O_3$ 15 $Al_2O_3$ 8 $La_2O_3$ 1 $Ce_2O_3$ 6 $Tb_2O_3$ | 85 | 72 |
| 12 | 70 $B_2O_3$ 15 $Al_2O_3$ 2 $La_2O_3$ 1 $Ce_2O_3$ 12 $Tb_2O_3$ | 80 | 73 |
| 13 | 70 $B_2O_3$ 15 $Al_2O_3$ 10 $La_2O_3$ 2 $Ce_2O_3$ 3 $Tb_2O_3$ | 88 | 72 |
| 14 | 70 $B_2O_3$ 15 $Al_2O_3$ 8 $La_2O_3$ 2 $Ce_2O_3$ 5 $Tb_2O_3$ | 89 | 72 |

What is claimed is:

1. A luminescent alumino-silicate and/or alumino-borate glass comprising lanthanum and/or gadolinium and activated by a rare earth metal, characterized in that the glass is activated by at least one of the rare earth metals $Tb^{3+}$ and $Ce^{3+}$ has a composition comprising 35–85 mol% of $SiO_2$ and/or $B_2O_3$, 1–35 mol% of $La_2O_3$ and/or $Gd_2O_3$, 5–45 mol% of $Al_2O_3$ and 0.5–30 mol% of $Tb_2O_3$ and/or $Ce_2O_3$ in which the $La_2O_3$ and/or $Gd_2O_3$ are replaceable in amounts up to than 50 mol% by one or more of the oxides $Y_2O_3$, $Sc_2O_3$, $Lu_2O_3$, $ZrO_2$, $P_2O_5$ and the alkaline earth metal oxides, the rare earth metal oxides being at least 99.99% pure and the other oxides being at least 99.999% pure, the luminescent glass having a quantum efficiency of at least 46% when excited by 254 nm radiation.

2. A luminescent glass as claimed in claim 1, characterized in that the glass comprises 50–80 mol% of $SiO_2$ and/or $B_2O_3$, 1–20 mol% of $La_2O_3$, 10–30 mol% of $Al_2O_3$ and 0.5–15 mol% of $Tb_2O_3$ and/or $Ce_2O_3$.

3. A luminescent screen having a luminescent layer comprising a luminescent alumino-silicate and/or alumino-borate glass as claimed in claim 2.

4. A luminescent screen having a luminescent layer comprising a luminescent alumino-silicate and/or alumino-borate glass as claimed in claim 1.

* * * * *